United States Patent Office 3,132,961
Patented May 12, 1964

3,132,961
FILLERS, PIGMENTS AND THE LIKE
Edward Keith Pierpoint, Largs, Scotland, and Norman Hopton Woodbury, Slough, England, assignors to Imperial Chemical Industries Limited, London, England, a corporation of Great Britain
No Drawing. Filed Sept. 28, 1960, Ser. No. 58,916
Claims priority, application Great Britain Oct. 12, 1959
11 Claims. (Cl. 106—308)

This invention relates to improvements in or relating to fillers, pigments and the like and more particularly to an improved process for rendering such substances hydrophobic.

Fillers, pigments and the like materials are used in a wide variety of applications for many purposes in which modification of the surface properties of these is required and for some of these it is desired to render them hydrophobic. One method hitherto used to achieve this purpose has been to treat the material with an organopolysiloxane. This has been carried out by mixing the substance to be treated with a low molecular weight organopolysiloxane and heating the mixture for a number of hours. This process can be used and gives satisfactory results if adequate heating is given. The necessity to heat does, however, add considerably to the cost of the process and the rate of treatment is limited by the size of the heating plant available. When no heating is given a long and variable time is required after treatment for the full development of hydrophobic properties and in fact some materials have been found which even one year after treatment with an organopolysiloxane such as octamethylcyclotetrasiloxane have not developed satisfactory hydrophobic properties. Thus it would obviously be highly desirable to have a process which gave satisfactory materials and did not involve either prolonged heating or prolonged storage.

An object of the present invention is to provide a process for rendering fillers, pigments and the like hydrophobic. Another object is to provide such a process which can be carried out without involving a prolonged heating step or prolonged storage. Other objects will appear hereinafter.

According to the present invention these objects are accomplished by treating a finely divided non-alkaline filler, pigment or the like with a low molecular weight diorganopolysiloxane in the presence of a small proportion of an acid.

Fillers, pigments and the like, which are normally of particle size not more than about 25 microns, which may be treated by the process of our invention include the naturally occurring silicas such as diatomaceous earths, manufactured silicas such as precipitated silicas, silica aerogels, fume silicas (i.e. the silicas obtained by burning silicon tetrachloride in the vapour phase to give a finely divided silica), asbestos and pigments such as red iron oxide and titanium dioxide. While the process of our invention is of considerable value for the treatment of many materials, its greatest advantages are believed to be in its application to manufactured silicas, particularly the fume silicas which it is frequently desired to use as fillers for organopolysiloxane elastomers. The advantages of our process are also shown to a greater extent with fillers of low acid number, e.g less than 0.4. (The acid number is the number of milligrams of caustic potash required to neutralise one gram of the filler in an aqueous suspension.)

The acid used in the process of our invention may be used as such or may be generated in situ. Acids which are preferred are those having a dissociation constant of not less than $1\times10^{-5}$ and a vapour pressure of not less than 0.2 mm. Hg at 20° C. Suitable acids include, for example, nitric acid, hydrochloric acid, formic acid, acetic acid, monochloracetic acid and trichloracetic acid. It is, however, preferred to use a volatile strong acid and, in fact, hydrochloric acid is preferred. In some cases, for example, when maximum speed of treatment is not desired it may be more convenient to use one of the weaker acids such as acetic acid, trichloracetic acid or formic acid since these are more easily handled and less corrosive than the stronger mineral acids and have the advantage that the anhydrous acids are soluble in the organopolysiloxanes used. If it is desired to generate the acid in situ one method which is eminently suitable is to employ a substance such as, for example, trimethyl borate or a halogenosilane such as a chlorsilane, which is soluble in organopolysiloxanes of the kind used and which generates acid on coming into contact with the material to be treated or with moist air.

The quantity of acid used may vary widely. Thus, for example, amounts of the order of 0.1 to 500 parts per 10,000 parts of material to be treated are normally adequate. It is, however, preferred to use amounts of the order of 1 to 100 parts per 10,000 parts of material to be treated. It has also been found that the amount of acid required will vary slightly with the acid number of the material being treated. The rate at which the treatment becomes effective will, of course, depend on the quantity used.

Diorganopolysiloxanes suitable for use in our process include those of molecular weight not greater than 500. It is, however, preferred to use a cyclic organopolysiloxane. The organo groups in the organopolysiloxane, which may or may not all be alike, may be alkyl groups such as methyl or ethyl groups, or unsaturated groups such as vinyl or allyl groups. Methyl groups are, in fact, preferred and it is further preferred to use octamethylcyclotetrasiloxane. The organopolysiloxane may be used in widely varying proportions. Normally proportions of the order of from 5 to 25 parts per 100 parts of material to be treated are adequate. The use of proportions greater than this does not confer any additional advantages commensurate with the increased cost and if lesser proportions are used the desired hydrophobic properties are not always achieved. It is preferred, however, to use proportions of the order of from 10 to 20 parts per 100 parts of material to be treated.

The process of our invention may be carried out by treating the filler or pigment in a variety of ways. Thus the material to be treated may be loaded into an incorporator, kettle or other vessel or container after which the organopolysiloxane and acid are added, either separately or together, and incorporated, for example, by use of a stirring or agitating device within the vessel or container or merely by agitation of the vessel or container. Alternatively, the material to be treated may be fluidised in a suitable vessel and the organopolysiloxane and acid passed thereinto either in the form of a liquid or as a vapour.

The process of our invention is normally preferably carried out at room temperature and in fact the use of elevated temperature is unnecessary. If it is desired, however, to further accelerate the process, elevated temperatures can be used. In some cases, however, it is undesirable for the treated material to retain any free acid since this might affect its properties in its ultimate application. This can be achieved by volatilisation, for example, by blowing an inert gas through or by slight heating.

Our invention is further illustrated but is to be understood as being in no way limited by the following examples in which all parts are by weight.

EXAMPLE 1

630 parts of octamethylcyclotetrasiloxane were added to 3150 parts of a fume silica prepared by burning silicon tetrachloride in the vapour state and having a surface area of about 175 m.$^2$/g. and an average particle size of 10 to 40 m$\mu$. 1.16 parts of concentrated aqueous hydrochloric acid were added to the mixture and the whole agitated until thoroughly mixed. The so-treated filler was maintained in a closed container at room temperature. After 22 hours this filler was tested by shaking with water and was found to be completely hydrophobic, i.e. none of the filler was wetted.

Samples of the same filler similarly treated but with the omission of the hydrochloric acid were completely hydrophilic after the same period of time.

EXAMPLE 2

1000 parts of the silica used in Example 1 were mixed with 100 parts of octamethylcyclotetrasiloxane and the mixture agitated. 3 parts N/1 hydrochloric acid were added and the whole mixed thoroughly. After a period of 2 days, the filler so-treated was completely hydrophobic.

The same fillter similarly treated but with the omission of hydrochloric acid was only 2/10 hydrophobic after 7 days.

EXAMPLE 3

1000 parts of the silica used in Example 1 were mixed with 200 parts of octamethylcyclotetrasiloxane and the mixture agitated. 3 parts of 2 N aqueous acetic acid were added and the whole mixed thoroughly. The so-treated filler was completely hydrophobic in less than 2 days.

The same filler similarly treated but with the omission of the acetic acid was not completely hydrophobic after 1 month.

EXAMPLE 4

200 parts of octamethylcyclotetrasiloxane containing one part of formic acid were thoroughly mixed with 1000 parts of the silica used in Example 1. The so-treated filler was completely hydrophobic in less than 2 days.

EXAMPLE 5

1000 parts of the silica used in Example 1 were mixed with 200 parts of octamethylcyclotetrasiloxane. 3 parts of 2 N monochloracetic acid were added to the mixture and the whole agitated. The so-treated filler was completely hydrophobic in less than 2.5 days.

EXAMPLE 6

1000 parts of a calcined naturally occurring diatomaceous earth of average particle size 2–4 $\mu$ were added to 100 parts of octamethylcyclotetrasiloxane and the mixture agitated. 6 parts of 2 N aqueous hydrochloric acid were added to the mixture and the whole thoroughly mixed. The so-treated filler was completely hydrophobic in less than 7 days.

The same filler similarly treated but with the omission of the hydrochloric acid was completely hydrophilic after 7 days.

EXAMPLE 7

1000 parts of a silica aerogel of average particle size 30 m$\mu$ and surface area 110 to 150 m.$^2$/g. were mixed with 200 parts of octamethylcyclotetrasiloxane after which 2 parts of 2 N hydrochloric acid were added to the mixture and the whole agitated. After a period of 64 hours the so-treated filler was almost completely hydrophobic.

The same filler similarly treated but with the omission of the hydrochloric acid was completely hydrophilic after the same period.

EXAMPLE 8

1000 parts of a precipitated silica of average particle size 22 m$\mu$ and surface area 160 m.$^2$/g. were mixed with 200 parts of octamethylcyclotetrasiloxane. One part of 2 N hydrochloric acid was added to the mixture and the whole agitated. After a period of 64 hours the so-treated filler was almost completely hydrophobic.

The same fillter similarly treated, but with the omission of the hydrochloric acid was completely hydrophilic after the same period.

EXAMPLE 9

200 parts of finely divided red iron oxide were mixed with 40 parts of octamethylcyclotetrasiloxane. 0.6 part of concentrated aqueous hydrochloric acid were added to the mixture and the whole agitated.

For purposes of comparison, a portion of the red iron oxide was treated with the same proportion of octamethylcyclotetrasiloxane but without acid and a further untreated portion was used as a control sample.

The treated material and the two samples not treated according to the invention were dispersed in toluene and the toluene suspensions shaken with water. Of the three samples only that treated according to the invention gave a water layer completely free from iron oxide. In the case of the other two samples not treated according to the invention, a considerable amount of iron oxide was found in the water layer.

EXAMPLE 10

1000 parts of the silica used in Example 1 were mixed with 100 parts of 1,3,5,7-tetramethyl-1,3,5,7-tetravinylcyclotetrasiloxane. 2.0 parts of concentrated hydrochloric acid were added to the mixture and the whole agitated until thoroughly mixed. After 24 hours the so-treated silica was completely hydrophobic.

A sample of the same silica similarly treated but with the omission of the hydrochloric acid was completely hydrophilic after 24 hours.

EXAMPLE 11

1000 parts of pigment grade titanium dioxide in the anatase form, of mean particle diameter of 0.2 micron, and having a titanium dioxide content of 98 percent was intimately mixed with 200 parts of octamethylcyclotetrasiloxane and 5 parts of concentrated hydrochloric acid. After standing at room temperature for several weeks a sample floated on water and did not wet or disperse upon gentle shaking. A sample treated in a similar manner without the addition of hydrochloric acid sank immediately when added to water and dispersed to give a fine suspension of pigment in water upon gentle shaking.

EXAMPLE 12

An intimate mixture of 100 parts of 1,3,5,7-tetramethyl-1,3,5,7-tetravinylcyclotetrasiloxane and 1000 parts of titanium dioxide pigment as used in Example 11 was treated with 2 parts of concentrated hydrochloric acid. After standing at about 20° C. for 10 days a sample floated on water and did not wet or disperse in water when gently shaken. A sample, treated as above, but without the addition of acid dispersed upon shaking in water.

EXAMPLE 13

1000 parts of asbestos fibre and 200 parts of octamethylcyclotetrasiloxane were thoroughly mixed together and treated with 10 parts of concentrated hydrochloric acid. After standing at 20° C. for 24 hours the asbestos mixture was completely unwetted by water and totally wetted by toluene. When shaken with a mixture of toluene and water the asbestos fibres were retained wholly in the organic layer. A sample of the same asbestos similarly treated but without the addition of acid remained completely hydrophilic even after 6 months' storage.

EXAMPLE 14

1000 parts of fume silica as used in Example 1, with an acid number of 0.24, and 200 parts of octamethylcyclotetrasiloxane were thoroughly mixed together. Five samples of 100 parts of this treated filler were removed and 2.5 parts of 10 N hydrochloric acid, 2 N hydrochloric acid, N/2 hydrochloric acid, N/10 hydrochloric acid or glacial acetic acid were added to the individual samples. Similar samples containing hydrochloric acid of various concentrations or acetic acid were prepared from fume silicas having acid numbers of 0.54 and 1.14. The samples were examined for hydrophobicity after standing at 20° C. for 1 day and 8 days. The results obtained are tabulated below:

*Estimate of Hydrophobicity*

|  | No. acid added | 10 N HCl | 2 N HCl | N/2 HCl | N/10 HCl | Acetic acid |
|---|---|---|---|---|---|---|
| After 1 day: Acid number of fume silica: |  |  |  |  |  |  |
| 0.24 | 0 | 10 | 10 | 10 | 1 | 2 |
| 0.56 | 3 | 10 | 10 | 4 | 3 | 10 |
| 1.14 | 10 | 10 | 10 | 10 | 10 | 10 |
| After 8 days: |  |  |  |  |  |  |
| 0.24 | 2 | 10 | 10 | 10 | 6 | 10 |

Hence it can be seen that although fume silica fillers of high acid number become hydrophobic without the addition of acid, the rate of becoming hydrophobic is considerably increased by the presence of added acid.

EXAMPLE 15

1000 parts of finely divided silica prepared by an electrothermal process of average particle diameter 10–100 millimicrons, apparent density 80–100 grams per litre, specific gravity about 2.2, and pH 9.0, was treated with 200 parts of octamethylcyclotetrasiloxane, the whole thoroughly mixed and 5 parts of concentrated hydrochloric acid added thereto. After standing in confinement at 20° C. for 1 day a sample of the so treated silica was completely hydrophobic. A similar sample prepared exactly as above except that 5 parts of glacial acetic acid were added in place of the hydrochloric acid was almost completely hydrophobic after 14 days. A sample prepared as above but without the addition of any acid was completely hydrophilic after 14 days.

EXAMPLE 16

An intimate mixture of fume silica as used in Example 1, 1000 parts, and hexamethyldisiloxane, 200 parts, were treated with 5 parts of glacial acetic acid. The so treated silica was completely hydrophobic after standing at room temperature for 2 days. A sample of the same filler treated as described but without the addition of acid was only partially hydrophobic after this time.

What we claim is:

1. A process for rendering finely divided non-alkaline filler material hydrophobic which comprises providing a quantity of a finely divided non-alkaline filler material, mixing and maintaining contact between said material and from 5 to 25 parts per hundred parts of material to be treated of a diorganopolysiloxane of molecular weight not greater than 500 in the presence of 0.1 to 500 parts per ten thousand parts of material to be treated of an acid having a dissociation constant of not less than $1 \times 10^{-5}$ and a vapor pressure of not less than 0.2 mm. Hg at 20° C., for a time sufficient to render said filler material hydrophobic.

2. A process as claimed in claim 1 wherein the acid is a volatile acid.

3. A process as claimed in claim 2 wherein the acid is hydrochloric acid.

4. A process as claimed in claim 1 wherein the filler material is of particle size not more than about 25 microns.

5. A process as claimed in claim 1 wherein the filler material is silica.

6. A process as claimed in claim 1 wherein the acid is generated in situ by reacting with moist air an acid generating substance which is soluble in said diorganopolysiloxane.

7. A process as claimed in claim 1 wherein the amount of the acid is about 1 to 100 parts per 10,000 parts of material to be treated.

8. A process as claimed in claim 1 wherein the diorganopolysiloxane is a cyclic organopolysiloxane.

9. A process as claimed in claim 1 wherein the diorganopolysiloxane is selected from the group consisting of dimethyl and methyl vinyl polysiloxane.

10. A process as claimed in claim 9 wherein the diorganopolysiloxane is octamethylcyclotetrasiloxane.

11. A process as claimed in claim 1 wherein the amount of diorganopolysiloxane is from 10 to 20 parts per 100 parts of material to be treated.

References Cited in the file of this patent

UNITED STATES PATENTS

| | | |
|---|---|---|
| 2,371,050 | Hyde | Mar. 6, 1945 |
| 2,742,378 | Grotenhues | Apr. 17, 1956 |
| 2,792,378 | Goodwin | May 14, 1957 |
| 2,886,460 | Alexander | May 12, 1959 |
| 2,938,009 | Lucas | May 24, 1960 |
| 2,993,809 | Bueche et al. | July 25, 1961 |
| 3,000,749 | Bachmann et al. | Sept. 19, 1961 |
| 3,004,859 | Lichtenwalner | Oct. 17, 1961 |
| 3,009,287 | Deuel et al. | Nov. 21, 1961 |